Aug. 23, 1966    R. G. WALKER ET AL    3,268,121
SPREADER HAVING A VARIABLE RATIO DRIVE
Filed March 9, 1964    3 Sheets-Sheet 1

INVENTORS.
RAYMOND D. HOOBLER
BY ROBERT G. WALKER

Albert L. Jeffers
Attorney

Aug. 23, 1966  R. G. WALKER ET AL  3,268,121
SPREADER HAVING A VARIABLE RATIO DRIVE
Filed March 9, 1964  3 Sheets-Sheet 2

INVENTORS.
RAYMOND D. HOOBLER
BY ROBERT G. WALKER
Albert L. Jeffers
Attorney

INVENTORS.
RAYMOND D. HOOBLER
BY ROBERT G. WALKER
Albert L. Jeffers
Attorney

United States Patent Office 3,268,121
Patented August 23, 1966

3,268,121
SPREADER HAVING A VARIABLE RATIO DRIVE
Robert G. Walker, Fort Wayne, Ind., and Raymond D. Hoobler, 3823 Park Side Drive, Fort Wayne, Ind.; said Walker assignor to said Hoobler
Filed Mar. 9, 1964, Ser. No. 350,271
5 Claims. (Cl. 222—177)

This invention relates to a dispensing apparatus which is usable for spreading a variety of materials over lawns, seed beds, of various kinds and is intended for use with a wide class of materials for which the apparatus can be adapted.

In modern landscaping, gardening applications, and the like, it is necessary to have a dispensing apparatus which is capable of spreading a substantial variation of materials including black dirt, compost, fertilizer, seed, lime and other such materials. The dispensing of these materials must be in accordance with a prescribed metering formula in order that the various soil treatments, conditioners and seeding actions are precisely in accordance with a desired operation. The described requirements are difficult to obtain because of the variation in size, consistency, and quality of material being dispensed. For example, lime is a powdery and relatively non-coherent material in dry state and it is to be contrasted with peat moss which is relatively coherent, is non-powdery, and of fibrous or semi-fibrous condition; both of these described products are in turn different from various seeds which are of particulate size and are grainy, hence dispensible in a manner differently from either the peat moss or lime material. It is a relatively difficult matter to provide a suitable apparatus which is capable of dispensing these various diverse materials which are dissimilar in their relative properties while at the same time requiring that such materials be dispensible in a controlled manner. The materials must be dispensible in a metered flow which corresponds with the desired soil conditioning or soil treatment.

In previous apparatus, the provisions for dispensing have been generally suitable only for dispersing one of a particular kind of material and the difficulty found in such prior apparatus is their relative inability to handle an assortment of the different materials which are commonplace in treatment of soil in landscaping operations, especially materials of high moisture content which tend to stick together.

It is one of the principal objects of the present invention to provide an apparatus which is capable of dispensing a substantial range of materials which vary in consistency, size, relative cohesiveness, etc., and which are required for a complete program of landscape operation.

It is a further object of the present invention to provide a new and improved apparatus which is capable of regulating the rate of dispensing of a variety of different materials so that the particular soil treatment may be precisely obtained with a given material.

A still further object of the present invention is to provide a novel control system whereby the operator can readily transport material to a given location of landscaping operation and start and stop the dispensing operations at the particular place of operation. This means that the apparatus serves a dual function of carrying the material to the place of treatment and there performing the treatment whether it be fertilizing, composting, seeding, etc., and performing these operations at the precise locations desired.

It is an important feature of the present invention that materials which tend to be coherent are readily dispensed by providing a shaker which is operated by lineal movement of the apparatus and insures a steady outflow of the material by a dispensing means which accurately discharges the material at the places required and in an even schedule of flow which is readily controllable by the operator. That is, the operator has available to him means for starting and stopping the operation and for controlling the schedule of flow and these controls are suitable to a variety of different materials.

Other objects, features of the present invention will become apparent from a consideration of the following description which proceeds with reference to the accompanying drawings, wherein.

Figure 1:
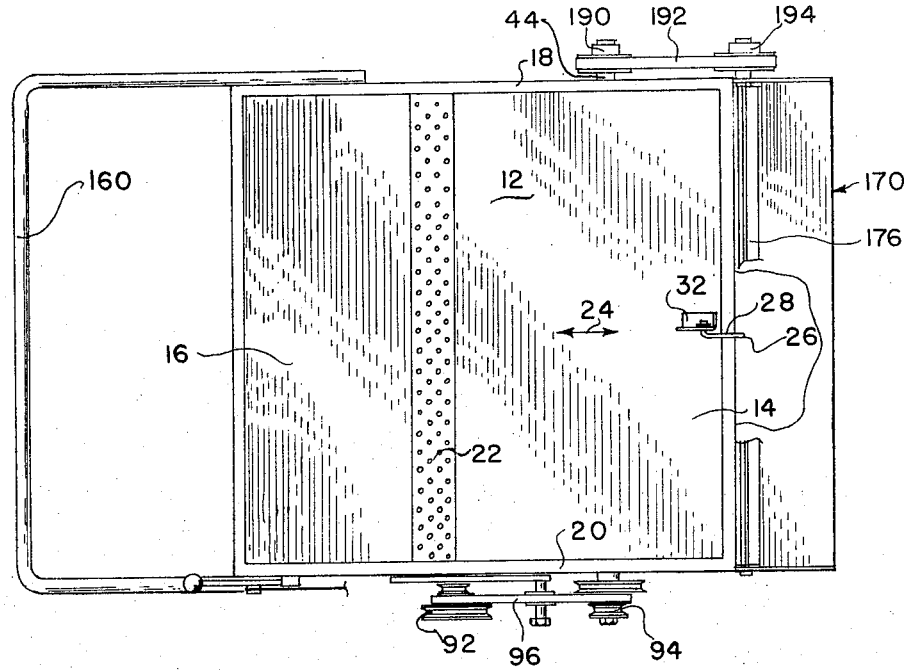
FIGURE 1 is a top view of the spreader or dispensing apparatus.

Referring now to the drawings, the spreader apparatus designated generally by reference numeral 10 includes a bin 12 for receiving the material to be dispensed, the two end walls 14, 16 of the bin being at a slight pitch or angle toward each other and the two side walls 18 and 20 being perpendicular, these four interior walls defining the interior of the bin 12. The walls channel the material in a generally downward direction toward the converging loading area 22 of belt 72. The interior end wall 14 of the bin is moved reciprocably in the direction of the two arrow-headed line 24 (FIGURES 1 and 4) and it may be serrated or "shingled" to facilitate downward travel of any material which tends to collect or bridge together and resists flowing to converging area 22.

The reciprocable agitating movement of the wall 14 is effected by a rod 26 having a U section 28 (FIGURE 4) which extends over the outer wall 30 of the apparatus and is connected with a flange 32 attached to the interior end wall 14. At the opposite end of the rod is a pivot connection 34 with a rocker arm 36 pivoted at 38 and having a cam follower 40 which engages with a cam 42 rotatable on shaft 44 so that as the apparatus is moved in the direction of the arrow 50, the ground engaging wheels 52 will rotate and turn the shaft 44 and cam 42, to periodically engage the follower 40 and effects its angular movement against the resistance of spring 54 whereby the operation of cam 42 and follower 40 produces through rocker arm 36 and rod 26 a downward direction of movement of the interior wall 14 and the stretch spring 54 will then reverse such movement as indicated by arrow 24. Such periodic back and forth agitating movement will force the material within the bin in a downward direction toward the discharge opening 22.

The cross-sectional area of the opening 22 is defined by the angular position of end wall or control gate 16 which is located interiorly of the outer wall 60 and is hinged at its upper end 62 so as to be located in various angular positions indicated by the double arrow-headed line 63. The angular position is controlled by an adjuster screw 64 which is threaded within an opening of the wall 60 and engages the wall 16 to move it angularly to whatever position is required for properly defining the dimensions of the outlet opening 22 and is thereafter locked in place by a nut 66.

It is the character of the material being dispensed which determines the appropriate width of opening 22, the size being made smaller for powdery, readily-dispensible materials and relatively larger for fibrous materials such as peat moss and moist top soil or black dirt.

Figure 3:
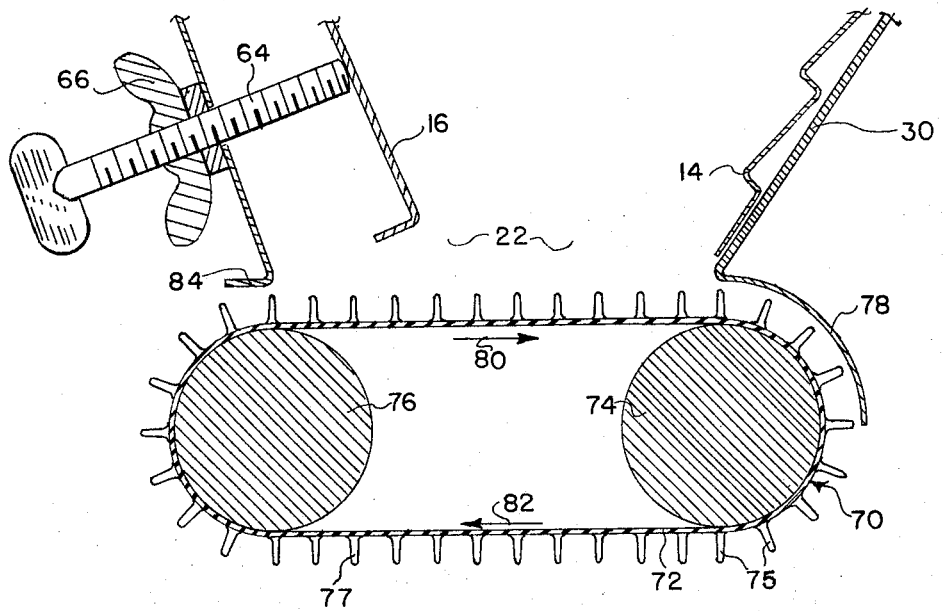
FIGURE 3 is an enlarged sectional view of the belt which is located at the outlet end of the apparatus and which regulates the outflow of materials.

Just below the outlet 22 (FIGURE 3) is a discharge device 70 which is in the form of a flexible belt 72 having regularly spaced projections 77, the belt being passed over two rollers, one a drive roller 74 and the other an idler roller 76 so that the belt will travel in the direction indicated by arrow 80 past the discharge opening 22 and shield 78 to first receive material within the spaces separating adjacent projections 77 and thereafter after having been stretched apart slightly in the vicinity of the drive roller as indicated at 75 to slightly enlarge the space between the projections 77 holding the charges of material, will face downwardly and release the loosened charge of material so received. The empty spaces then continue travel in a direction indicated by arrow 82 which is reversed from the first direction 80 and after passing over idler roller 76 the emptied projections again move past opening 22 to receive additional increments of the material. Thus by spreading or enlarging the projections 77 the material being dispensed will not stick to the projections or belt.

The driven roller 74 is operated around a drive shaft 90 by a stepped diameter pulley 92 (FIGURE 1) which coacts with a second stepped diameter pulley 94 with an adjustable belt 96. The adjustable belt 96 can be connected with a selected diameter portion of the pulley 92 and 94 respectively so that at a given speed or rotation of the shaft 44 by the ground engaging wheels 52 the pulley 92 will be driven at a faster or slower rate depending upon the adjusted position of the belt 96 on pulleys 92 and 94 and thereby control the speed of movement of the flexible belt 70. In this manner, the rate of dispensing the material is controlled. That is, if the belt 96 is adjusted to couple pulley 94 with pulley 92 such that pulley 92 rotates at maximum speed, then for a given lineal travel of the apparatus the flexible belt 70 will move at maximum speed and will discharge a maximum quantity of the material from within bin 12. Conversely, as the belt 96 is adjusted to rotate the stepped pulley 92 at the slowest possible speed then there will be dispensed a minimum quantity of the material from bin 12 by reason of the slower movement of belt 70.

Figure 2:
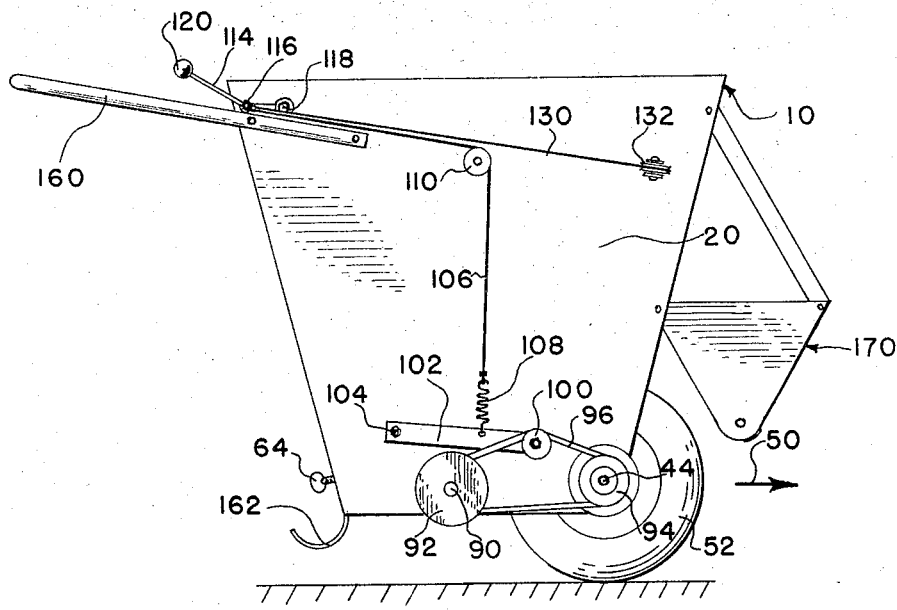
FIGURE 2 is a side elevation view of the apparatus shown in FIGURE 1 and illustrating the drive means and control means for starting and stopping the spreading operation.
Figure 6:
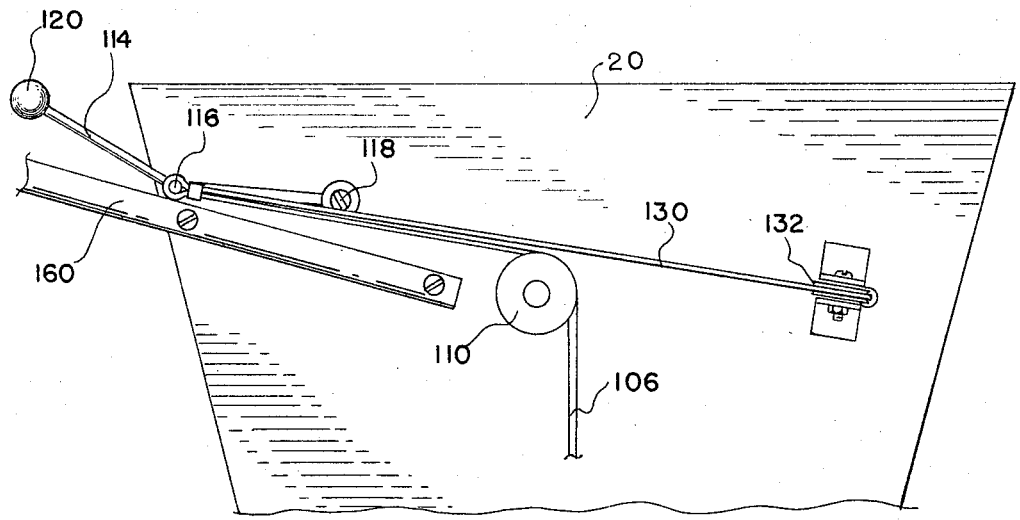

The belt 70 will not be operated by the set of stepped pulleys 92 and 94 unless the belt 96 is tensioned to form an effective coupling between the two pulleys, this belt tensioning being produced by an angularly movable idler roller 100 (FIGURE 2) which is mounted on a lever 102 pivoted at 104 and movable by a cable 106 connected through spring 108 to lever 102. The cable 106 is passed over a pulley 110 and connects with a control lever 114 at 116 (FIGURES 2 and 6). The control lever 114 is pivoted at 118 and is readily manually operated through knob 120 to communicate or relieve tension on cable 106 and thus produce either an effective coupling between the stepped pulleys by raising idler roller 100 and causing the stepped pulleys to co-rotate or by moving the idler roller 100 (FIGURE 2) downwardly to produce sufficient slack in the belt 96, that the two stepped pulleys 92, 94 are no longer co-rotated and the dispensing belt 70 will not be actuated.

Figure 5:
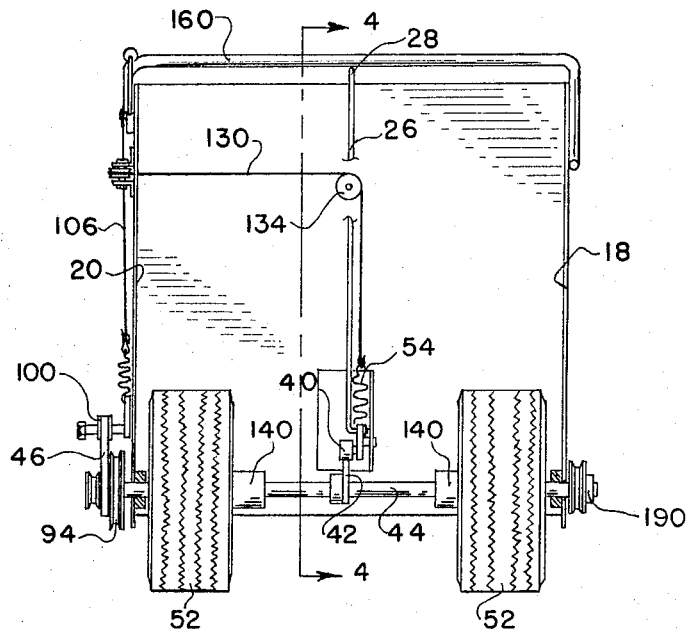
FIGURE 5 is a front view of the apparatus viewed from the right-hand end of FIGURE 4 with seed hopper omitted; and, FIGURE 6 is an enlarged detail view of the operating mechanism for starting and stopping the spreading operation.

In this manner, the material within bin 12 will either be dispensed or not depending upon the position of the control lever 114. At the same time that the cable 106 is tensioned, a second cable 130 also connected with lever 114 and which is passed over change direction pulley 132 (FIGURES 2 and 6) and pulleys 134 (FIGURE 5) is suitably tensioned to stretch the spring 54 and thereby provide for actuation of the shaker rod 26. Therefore, concurrently, the shaker and discharge device 70 are made operative by lineal movement of the apparatus and by operation of the same control lever. The belt 70 and shaker wall 14 are both actuated ultimately from the shaft 44 connected to the ground engaging wheels 52 and a one way clutch 140 of conventional construction (FIGURE 5) prevents movement of the shaft 44 when the wheels are counterrotated, i.e., the apparatus is pulled backwardly instead of being pushed forwardly. In this way, it is possible to back up the apparatus and cover any missed spots without overcoating or overdispensing in the process of reverse travel.

A seeder 170 is mounted on the front of the spreader by means of the brace 182 and the anchor bolt 186. The seeder is provided with sidewalls 172 which converge toward the bottom forming an opening 180. End plates 174 are connected to the sideplates 172 to form a hopper for the seed. An agitator 176 is disposed above the opening 180. A slidable gate 178 is provided to control the opening 180. A drive pulley 190 (FIGURE 1) is mounted on the shaft 44 for rotating the agitator 176 through pulley 194 and drive belt 192.

In operation, the bin 12 of the spreader is filled with the material to be dispensed as for example peat moss, compost, organic fertilizer, black dirt, calcium chloride or any mixture of the various materials and transported to the place of spreading by means of the handle 160. During the transport period, the control lever 114 is pivoted clockwise (FIGURES 2, 6) on its pivot 118 so as to relax the cables 106 and 130 whereby the shaker and the dispenser or discharge device 70 at the bottom of the opening 22 are both inoperative.

At the time that spreading operation commences the discharge opening 22 has been adjusted or is adjusted to provide the proper dimension or the opening 22 which is best suited for the character of the material being dispensed. This adjustment is effected by swinging the side 16 (FIGURE 4) about its hinge 62 by the adjuster screw 64 then clamping this part in place by the nut 66. The control lever 114 is then pivoted counterclockwise on pivot 118 (FIGURE 6) producing tension in cables 106 and 130, the cable 106 thereby serving to pivot lever 102 counterclockwise about its pivot 104 and acting through spring 108 causing the idler 100 to move upwardly and produce sufficient tension in belt 96 so as to couple the stepped diameter pulleys 92 and 94 and cause them to rotate together. The amount of material dispensed per lineal travel of apparatus 10 is determined by the rate of rotation of the stepped diameter pulley 92 and this can be accomplished by selecting which diameter portion of pulley 92 is connected with the coacting portion of pulley 94. The general rule is that in order to increase the material to be dispensed per lineal foot a greater speed of rotation is obtained for pulley 92. The three different diameter portions of pulley 92 together with the three diameter portions of pulley 94 provide three graduated rates of metering for the material thus providing a sufficient range of metering to suit a wide variety of materials.

Once the metering rate is determined by suitably coupling respective portions of the two pulleys, the apparatus is pushed on its ground engaging wheels 52 causing the shaft 44 through clutches 140 (FIGURE 5) to power the drive pulley 94 and thus the driven pulley 92 which, acting through its shaft 90, powers driven roller 74 (FIGURE 3) and rotates the endless belt of device 70 around the driven roller 74 and idler roller 76.

As the belt moves past opening 22 the spaces between adjacent projections 77 are filled with material and as these portions then pass over the driven roller 74 projections 77 are stretched slightly apart to loosen the portion of material contained therebetween. The belt then reverses its movement in the direction of the arrow 82 faces downwardly and the portions of material previously contained are dropped onto the ground and the belt then moves over the idler roller 76 and then in the direction of the arrow 80 to receive additional material for dispensing.

The rate of dispensing is a direct function of the rate of travel of the flexible dispensing belt 70 which in turn is a function of the belt 96 positioned on the pulleys 92, 94. While the apparatus is moving in the direction of the arrow 50 (FIGURE 2) and tension is present in the cable 130 the spring 54 (FIGURE 5) together with periodic engagement of the follower 40 (FIGURE 4) by the rotatable cam 42 will cause the rocker arm 36 to rock back and forth on its pivot 38 and such rocking movement will reciprocate shaker rod 26 and the inner wall 14 to agitate the material within the bin 12 to prevent it from collecting at the top part of the bin and ensures filling the opening 22.

Figure 4:
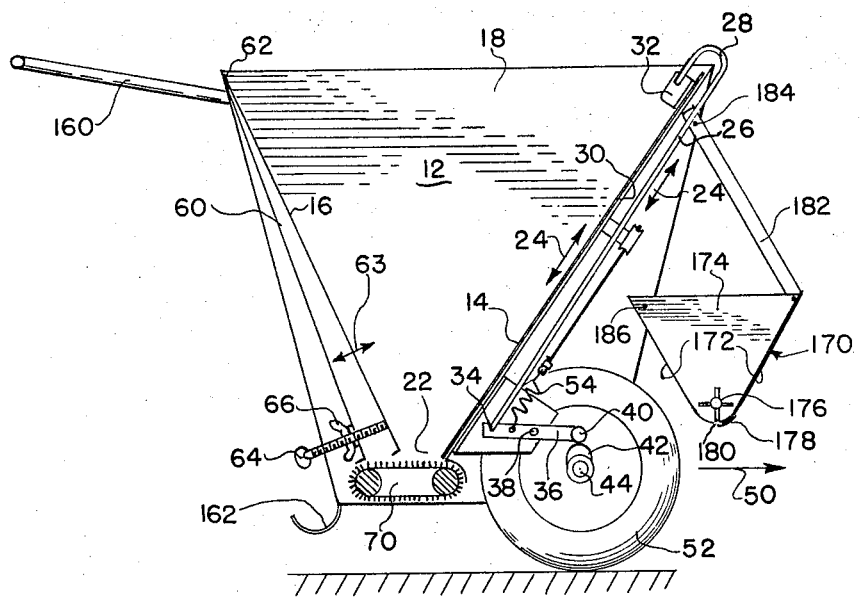
FIGURE 4 is a cross sectional view illustrating details of the shaker apparatus and the associated operating mechanism, this figure being taken on line 4—4 of FIGURE 5.

Thus, the opening 22 is at all times filled with the material to be dispensed and the rate of dispensing such material remains a direct function at all times of the adjustable position for the belt 96. When the apparatus is stopped there is no problem of drainage of the material because the belt 70 fills the discharge space 22 and no material will be dispensed except during forward travel of the apparatus in the direction of the arrow 50 (FIGURE 4). The device 70 is not actuated during the reverse movement of the apparatus because one way clutches 140 are effective for rotating the shaft 44 only during forward travel of the apparatus and the driven pulley 94 which is in turn coupled with pulley 92 and thence to belt 70 is operative only through the one way clutches 140 in the forward direction of movement of the apparatus.

If it is desired to seed a particular area the desired seed is placed in the seeder 170 which is operated through the drive pulley 190. The amount of seed to be dispensed is controlled by the slidable gate 178.

The operator can at any time stop the dispensing operation by pivoting the control lever 114 clockwise about pivot 118. A rear support 162 is provided to engage the ground when the apparatus is not in use.

It is anticipated that the invention can be used with a dispensing apparatus other than the flexible belt 70, cylinder (not shown) having tines or fingers projecting radially from the cylinder may be substituted for the belt 70. There has also been used cylinders with blades projecting radially from the cylinder and it has been found that the particular construction blade, tine, etc., is generally adaptable particularly to a given class of material. However, the flexible belt 70 is generally useful for all classes of materials, an important feature of which being the precise metering per lineal travel and the method whereby a given charge of the material is released from the spaces between the projections (FIGURE 3) by flexing a part of the projections 77. It should be understood however that these other construction cylinders are equally suitable and are included within the teaching of the invention. Also, the invention has been adapted to be powered by motor means rather than manually driven and this expedient is also comprehended by the invention.

Although the present invention has been disclosed in connection with the few selected example embodiments, it will be understood that these are illustrative and are in no sense restrictive of the invention. It is maintained that such variations and revisions of the invention, as are reasonably to be expected on the part of those skilled in the art to meet individual design requirements, will be included within the scope of the following claims as equivalents of the invention.

We claim:

1. In a dispensing apparatus having a bin for receiving the material to be dispensed and including a discharge opening at the base thereof, the combination comprising:
   (a) a flexible belt having projections which receive the material for dispensing therebetween and having two spaced rotatable members between which said belt travels endlessly;
   (b) a discharge opening through which the material is dispensed by movement of the belt and flexing thereof to cause a release of such material contained between the projections as the projections are stretched slightly apart;
   (c) means actuated by the lineal unit of movement of said dispensing apparatus for actuating the said flexible belt to produce its endless movement effecting such dispensing operation;
   (d) means forming a discharge opening through which the material is dispensed onto the surface of the belt;
   (e) means for controlling the effective cross section area of the discharge opening in accordance with the character of the material for dispensing;
   (f) and means for operatively controlling the rate at which the belt travels to regulate the amount of material dispensed per lineal unit of movement of the dispensing apparatus.

2. A dispensing apparatus comprising in combination:
   (a) a carriage means having a bin including a discharge at the bottom thereof, said bin being adapted for receiving the material to be dispensed and mounted on wheels for ease of transportation;
   (b) manual operable control means for controlling the start and termination of dispensing operations;
   (c) dispensing means operated by said control means and located at the discharge end of the bin to receive the material therein and including a drive connection with said carriage means whereby the material in the bin is controllably dispensed;
   (d) adjustable means for regulating the rate of movement of said dispensing means and thereby to control the amount of material which is dispensed per lineal unit of movement of the apparatus;
   (e) and shaker means forming a wall of said bin and operatively movable during translational movement of the apparatus to urge the material in a generally downward direction within the bin toward its discharge opening end.

3. A dispensing apparatus comprising in combination:
   (a) a carriage means having a bin including a discharge at the bottom thereof, said bin being adapted for receiving the material to be dispensed and mounted on wheels for ease of transportation;
   (b) manual operable control means for controlling the start and termination of dispensing operations;
   (c) dispensing means operated by said control means and located at the discharge end of the bin to receive the material therein and including a drive connection with said carriage means whereby the material in the bin is controllably dispensed;
   (d) adjustable means for regulating the rate of movement of said dispensing means and thereby to control the amount of material which is dispensed per lineal unit of movement of the apparatus;
   (e) shaker means forming a wall of said bin and operatively movable during translational movement of the apparatus to urge the material in a generally downward direction within the bin toward its discharge opening end;
   (f) and clutch means forming an operative connection between said apparatus and drive means for the dispensing means to render the dispensing means inoperative during reverse movement of the apparatus.

4. The structure in accordance with claim 2 wherein one of the walls of said bin is movable to define the effective cross-sectional area of the discharge opening in accordance with the type of material being dispensed.

5. An improved spreading device adapted for dispensing a substantial variety of materials and at a controllable rate, comprising:
   (a) container means having a movable wall defining a portion of the container which is adapted to receive the material for spreading;

(b) a cam-and-cam follower means actuated by the translating movement of said device and operatively connected to said movable wall and including means operatively connected to said cam-and-cam follower means, and actuated by the translating movement of said device;

(c) and dispensing means proportioned to fill the outlet of said container and adapted to withdraw and discharge material from the container and eject it through said outlet, said dispensing means being comprised of a resilient belt having spaced projections which receive therebetween charges of the material and are flexed to break loose and discharge said material during travel of the resilient belt.

References Cited by the Examiner

UNITED STATES PATENTS

| | | | |
|---|---|---|---|
| 296,024 | 4/1884 | Lucas | 222—287 |
| 322,952 | 7/1885 | Miller | 222—234 X |
| 533,252 | 1/1895 | Thomas | 222—310 |
| 613,591 | 11/1898 | McWhorter | 222—415 |
| 1,492,036 | 4/1924 | Kjolstad | 222—287 X |
| 2,025,184 | 12/1935 | Twose | 222—234 X |
| 2,286,554 | 6/1942 | Lieberman | 222—317 X |
| 2,913,150 | 11/1959 | Seale | 222—310 |
| 3,021,978 | 2/1962 | Cunliffe | 221—82 X |
| 3,164,301 | 1/1965 | Hargreaves et al. | 222—177 X |

FOREIGN PATENTS 1,107,987  5/1961  Germany.

M. HENSON WOOD JR., *Primary Examiner.*

LOUIS J. DEMBO, ROBERT B. REEVES, *Examiners.*

A. N. KNOWLES, *Assistant Examiner.*